US009894070B2

(12) United States Patent
Vajravelu et al.

(10) Patent No.: US 9,894,070 B2
(45) Date of Patent: Feb. 13, 2018

(54) METHOD AND SYSTEM FOR CONTROLLING ACCESS TO SHARED DEVICES (71) Applicant: ARUBA NETWORKS, INC., Sunnyvale, CA (US)

(72) Inventors: Edward Vajravelu, Bangalore (IN); Arun R Kumar, Bangalore (IN); Ashish Vyas, Bangalore (IN); Ramalingeswara Reddy Onteddu, Bangalore (IN); Varun Shah, Sunnyvale, CA (US)

(73) Assignee: ARUBA NETWORKS, INC., Sunnyvale, CA (US)

(*) Notice: Subject to any disclaimer, the term of this patent is extended or adjusted under 35 U.S.C. 154(b) by 0 days.

(21) Appl. No.: 14/507,292

(22) Filed: Oct. 6, 2014

(65) Prior Publication Data
US 2016/0065578 A1   Mar. 3, 2016

Related U.S. Application Data (60) Provisional application No. 62/042,749, filed on Aug. 27, 2014.

(51) Int. Cl.
*G06F 7/04* (2006.01)
*H04L 29/06* (2006.01)
*H04L 29/08* (2006.01)

(52) U.S. Cl.
CPC ........... *H04L 63/10* (2013.01); *H04L 63/101* (2013.01); *H04L 67/10* (2013.01); *H04L 69/16* (2013.01)

(58) Field of Classification Search
CPC ........... G06F 2003/0692; G06F 3/0601; G06F 17/30194; G06F 21/10; G06F 21/44; G06F 21/53; G06F 21/606; G06F 9/468; G06F 21/41; H04L 63/083; H04L 63/0876; H04L 67/1097; H04L 63/104; H04L 63/0815; H04L 63/0861; H04L 63/18; H04L 2463/062; H04L 63/06; H04L 63/0838; H04L 63/0853; H04L 63/10; H04L 63/168; H04L 63/08; H04L 63/101; H04L 63/105; H04L 67/10; H04L 67/42
(Continued)

(56) References Cited

U.S. PATENT DOCUMENTS 8,812,744 B1 * 8/2014 Iyigun .................. G06F 3/0608
710/15
2009/0304009 A1 * 12/2009 Kolhi ...................... H04L 63/08
370/400

(Continued)

*Primary Examiner* — Kambiz Zand
*Assistant Examiner* — Abiy Getachew
(74) *Attorney, Agent, or Firm* — Hewlett Packard Enterprise Patent Department (57) ABSTRACT

A non-transitory computer readable medium includes computer readable program code including instructions for snooping a message from a client device addressed to a particular IP address corresponding to a shared device; determining whether the client device has authorization to access the shared device; responsive to determining that the client device does not have authorization to access the shared device, refraining from forwarding the message to the particular IP address; and responsive to determining that the client device has authorization to access the shared device, forwarding the message to the particular IP address.

23 Claims, 3 Drawing Sheets (58) Field of Classification Search
USPC .............................................................. 726/4
See application file for complete search history.

(56) References Cited

U.S. PATENT DOCUMENTS

| | | | |
|---|---|---|---|
| 2010/0153394 A1* | 6/2010 | Wood ................... | G06Q 10/107 707/737 |
| 2010/0191839 A1* | 7/2010 | Gandhewar ....... | H04L 29/12028 709/220 |
| 2010/0215684 A1* | 8/2010 | Barnes ................... | A61K 39/09 424/190.1 |

* cited by examiner

METHOD AND SYSTEM FOR CONTROLLING ACCESS TO SHARED DEVICES

BENEFIT CLAIM

This application claims priority to provisional patent application 62/042,749 filed on Aug. 27, 2014 and titled "Method and System for Controlling Access to Shared Devices.

FIELD

The present disclosure relates to controlling access to shared devices. Specifically, the present disclosure relates to preventing access to shared devices that have not been identified by a requesting device using approved mechanisms.

BACKGROUND

Wireless digital networks, such as networks operating under the current Electrical and Electronics Engineers (IEEE) 802.11 standards, are spreading in their popularity and availability. Conventionally, in a wireless local area network (WLAN), a client device may discover only a limited set of shared devices that are presented to the client device by an intermediate network device.

Advances in communication protocols now allow for client devices to discover shared devices that have not been presented by an intermediate network device. Accordingly, client devices are able to communicate directly with shared devices without approval by intermediate network devices.

BRIEF DESCRIPTION OF THE DRAWINGS

Illustrative embodiments of the present invention are described in detail below with reference to the following drawing figures.

DETAILED DESCRIPTION

The present disclosure may be best understood by referring to the following description used to illustrate embodiments of the present disclosure. Any combination and/or order of components and/or operations described herein may be used to implement one or more embodiments. Certain components and/or operations may be entirely skipped.

TABLE OF CONTENTS

A. OVERVIEW . . . 2
B. SYSTEM ARCHITECTURE EXAMPLE . . . 3
C. BLOCKING COMMUNICATION BETWEEN A SHARED DEVICE AND A CLIENT DEVICE . . . 12
D. BLOCKING A REQUEST BY A CLIENT DEVICE FOR DETERMINING FUNCTIONALITY OF A SHARED DEVICE . . . 16

A. Overview

In general, embodiments provide a method, system of one or more devices, and a non-transitory computer readable medium for controlling access to shared devices.

In an embodiment, a network device identifies communication between a client device and a shared device that has not been authorized by that network device (including other network management devices). At least in response to identifying communication between a client device and a shared device that has not been authorized, the network device blocks the communication. The communication may be blocked permanently or temporarily until the client device is determined to be authorized.

In an embodiment, an Internet Protocol (IP) address of a shared device is presented by a network device to a client device if the client device is authorized to access the shared device. If the client device obtains the IP address of the shared device without being authorized (e.g., without the network device presenting the IP address to the network device), and attempts to communicate directly with the shared device, the communication is blocked.

B. System Architecture Example

Figure 1:
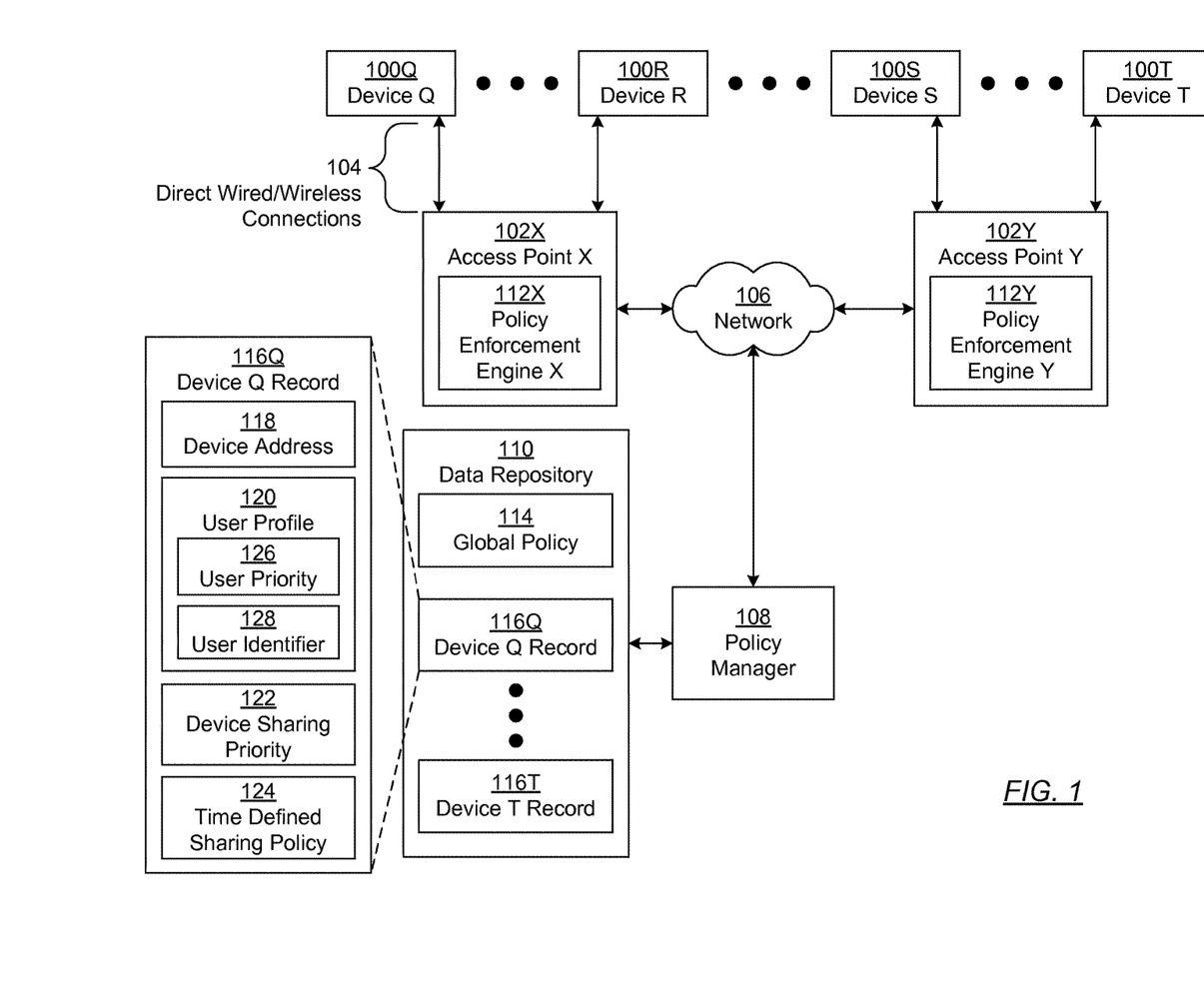
FIG. 1 shows a schematic diagram of a system for controlling access to shared devices, in accordance with one or more embodiments.

FIG. 1 shows a schematic diagram of a system in accordance with one or more embodiments. As shown in FIG. 1, the system includes devices (e.g., device Q (100Q), device R (100R), device S (100S), device T (100T)), access points (e.g., access point X (102X), access point Y (102Y)), a network (106), a policy manager (108), and a data repository (110). Each of these components is discussed below in accordance with one or more embodiments.

In one or more embodiments, a device (e.g., device Q (100Q), device R (100R), device S (100S), device T (100T)) is a hardware component that receives a service from another device of the system and/or provides a service to another device of the system. Specifically, when the device receives a service, the device may be referred to as a client device with respect to the service. When a device provides a service, the device may be referred to as a shared device with respect to the service. A shared device is a device that provides services to at least one client device. If the shared device provides services to multiple client devices, the services may or may not be provided at the same time. In one or more embodiments, each particular device (e.g., device Q (100Q), device R (100R), device S (100S), device T (100T)) in FIG. 1 may be a client device and a non-shared device, a shared device and a non-client device, or both a client device and a shared device.

In one or more embodiments, a device (e.g., device Q (100Q), device R (100R), device S (100S), device T (100T)) may be one or more mobile devices (e.g., laptop computer, smart phone, personal digital assistant, tablet computer, or other mobile device), gaming console, desktop computers, servers, blades in a server chassis, or any other type of electronic device or devices that includes at least the minimum processing power, memory, and input and output device(s) to perform one or more embodiments. For example, the device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor. The device may also include one or more input device(s), such as a touchscreen, keyboard, mouse, microphone, touchpad, electronic pen, or any other type of input device. Further, the device may include one or more output device(s), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely (e.g., via the network) connected to the hardware processor(s), memory, and storage device(s). Many different types of devices exist, and the aforementioned input and output device(s) may take other forms.

The device may be connected to a network (106) via a network interface connection (not shown) and an access point (e.g., access point X (102X), access point Y (102Y)). The network (106) may be a local area network (LAN), a wide area network (WAN) such as the Internet, mobile network, or any other type of network, or a combination of networks.

An access point (e.g., access point X (102X), access point Y (102Y)) is a digital hardware device that may be communicatively coupled to the network (106). The access point (e.g., access point X (102X), access point Y (102Y)) is a separate hardware unit from device (e.g., device Q (100Q), device R (100R), device S (100S), device T (100T)), that is directly, wired or wirelessly, connected to the device and is in a communication path from the device to the network. In other words, the access point may be directly connected via the direct wired/wireless connection (104) to a network interface card on the device (e.g., device Q (100Q), device R (100R), device S (100S), device T (100T)). Further, access points may be directly connected to the network (106) or connected via a controller. By way of an example, the access point may include a wireless access point (WAP) that communicates wirelessly with devices using Wi-Fi, Bluetooth or related standards and that communicates with a wired network.

Each access point may be connected to any number of devices at any moment in time. Specifically, each access point may be connected to no devices, a single device, or multiple devices at any particular moment in time. Further, the number of devices connected to an access point may be heterogeneous amongst access points.

One or more of the access points (e.g., Access Point 102X or Access Point (102Y), or one or more controllers (not shown) may include a policy enforcement engine (e.g., policy enforcement engine X (112X), policy enforcement engine Y (112Y)). In one or more embodiments, a policy enforcement engine (e.g., policy enforcement engine X (112X), policy enforcement engine Y (112Y)) is hardware, software, firmware, or a combination thereof that includes functionality to enforce policies (e.g., time defined sharing policy (124) (discussed below), global policies (114) (discussed below)). In one or more embodiments, the policy enforcement engine may include functionality to obtain a shared policy and/or a global policy, make a decision whether a client device may use a particular shared device based on the shared policy and/or global policy, and/or block communication between a shared device and a client device. Alternatively or additionally, the policy enforcement engine may include functionality to obtain, from a cache (not shown) on the access point, a cached decision indicating whether the client may use a particular shared device and deny access and/or not expose the shared device to the client device based on the decision.

Continuing with FIG. 1, the access points (e.g., access point X (102X), access point Y (102Y)) may be operatively connected, continuously or intermittently, directly or via the network, to a policy manager (108). The policy manager (108) may correspond to a computing system or execute on a computing system and cause the computing system to manage policies (e.g., global policies (114), time defined sharing policy (124)). In an example, the policy manager (108) is implemented on a controller configured for managing Access Point 102X. In another example, the policy manager (108) is implemented on Access Point 102X. Managing policies may include receiving new policies, deleting old policies, ensuring that policies on the access points are current, transmitting policies and/or decisions to the access points (e.g., access point X (102X), access point Y (102Y)), associating users with policies, and performing other actions.

In an embodiment, the policy manager (108) is connected to a data repository (110). In one or more embodiments, the data repository (110) is any type of storage unit and/or device (e.g., a file system, database, collection of tables, or any other storage mechanism) for storing data. Further, the data repository (110) may include multiple different storage units and/or devices. The multiple different storage units and/or devices may or may not be of the same type or located at the same physical site. Further, the data repository may be or may execute on the same computing system as policy manager (108). Alternatively or additionally, the data repository (110) may be on a separate computing system.

The data repository (110) includes functionality to store global policies (114) and device records (e.g., device Q record (116Q), device T record (116T)) for each device connected to an access point (e.g., access point X (102X), access point Y (102Y)) in the system. A global policy (114) is a policy that applies to all devices. For example, a global policy (114) may be to enforce an ordering of the shared devices when presented to a user, that the shared devices are to be filtered based on location of the access point directly connected to the client device, and other such policies.

A device record (e.g., device Q record (116Q), device T record (116T)) is information about a device. Any mechanism may be used to store a device record without departing from the scope of the claims. In particular, a device record may be a file, a database record, an entry or row in a table, or another data structure.

FIG. 1 shows an expanded view of device Q record (116Q) in one or more embodiments. The same or similar record may exist for the various other devices in the system. As used herein a device record includes data when the data is directly in the storage structure of the device record or when the device record directly or indirectly links to the data.

As shown in FIG. 1, device Q record (104) may include a device address (118), a user profile (120), a device sharing priority (122), and a time defined sharing policy (124) in accordance with one or more embodiments. Each of these components is discussed below.

A device address (118) is a unique identifier for a device. For example, the device address may be a media access control (MAC) address, a serial number of the device, or another unique identifier of the device.

In one or more embodiments, the user profile (120) corresponds to information about a user of the device. A user profile (120) may include a user identifier (128) and a user priority (126). A user identifier (128) is a unique identifier of a user. The user identifier (128) may be a single piece of identification (e.g., tax identifier, login name, email address, a system assigned unique identifier) or combination of identifiers (e.g., combination of mailing address and name, combination of name and birthdate, or other combination). A user priority is a value that defines the rank of the client device user. For example, when device Q record (116Q) is for device acting in the role of a client device, the user priority defines the rank of the client device user with respect to other client device users when requesting access to one or more shared devices. Thus, the user priority defines an importance of a client device user using services of a shared device as compared to other client device users using services from a shared device. In one or more embodiments, the user priority may be an independently defined value on a scale. For example, each user may be assigned a value from one to ten irrespective of the value assigned to other users. In one or more embodiments, the user priority may be a relative ranked value of the user with respect to other users. In other words, the users may be ordered and a value assigned to the user that defines the position of the user with respect to the order.

Continuing with FIG. 1, in one or more embodiments, a device sharing priority (122) is a priority assigned to a device. In one or more embodiments, the device sharing priority (122) defines a rank of the shared device with respect to other devices. The device sharing priority is defined based on whether a service of the particular shared device is to be preferred over other devices. For example, shared devices in a conference room may be assigned a higher device sharing priority value than shared devices in individual offices. Further, shared devices of individual users may be assigned a lower device sharing priority value than shared devices belonging to the IT department. In one or more embodiments, the device sharing priority is globally defined. In other words, the device sharing priority is defined independently of the access to the device. Thus, the device sharing priority for a shared device does not depend on the user, location of the client device, or client device accessing the shared device. Similar to the user priority (126), the device sharing priority (122) may be independently defined on a scale with respect to other shared devices or may be defined relative to other shared devices.

In one or more embodiments, the time defined sharing policy (124) is a sharing policy that is dependent on time. A sharing policy may specify a collection of users that may use the shared device, a collection of client devices that may use the shared device, respective access rights that each user or client device may have with respect to using the client device, and other permissions required to use the shared device. In one or more embodiments, the time defined sharing policy (124) may specify a start time and an expiration time for the time defined sharing policy. The start time is the time in which the time defined sharing policy begins to be effective. The expiration time is the ending time in which the time defined sharing policy stops being effective. Various mechanisms may be used to specify the start time and/or expiration time. For example, the start time and/or expiration time may be defined relative to an event (e.g., start of business day, a user logging in, conference times, or another event), defined in absolute values, defined relative to the expiration time or the start time, or defined using another technique. Further, the times may be defined as recurring or at a single moment. The same device may have multiple time-defined sharing policies. For example, one time defined sharing policy may be for the shared device user and another time defined sharing policy may exist for client device users that may use the shared device. Other sharing policies that are not time defined may exist and be enforced without departing from the scope of the claims.

In one or more embodiments, one or more of the components of the device record may be omitted when the device is non-shared or non-client device. For example, if the device is non-client device, then the device may omit a user priority. By way of another example, if the device is non-shared device, the device may omit the device sharing priority and the time defined sharing policy in accordance with one or more embodiments.

Although not shown in FIG. 1, software instructions in the form of computer readable program code to perform embodiments may be stored, in whole or in part, temporarily or permanently, on a non-transitory computer readable medium, such as a CD, DVD, storage device, a diskette, a tape, flash memory, physical memory, or any other computer readable storage medium. Specifically, the software instructions may correspond to computer readable program code that when executed by a processor(s), is configured to perform embodiments. The aforementioned software instructions may be or may implement all or a part of the access point (e.g., access point X (102X), access point Y (102Y)), the policy manager (108), the data repository (e.g., device Q (100Q), device R (100R), device S (100S), device T (100T)), and/or another component.

While FIG. 1 shows a configuration of components, other configurations may be used without departing from the scope of the claims. For example, various components may be combined to create a single component. As another example, the functionality performed by a single component may be performed by two or more components.

C. Blocking Communication Between a Shared Device and a Client Device

Figure 2:
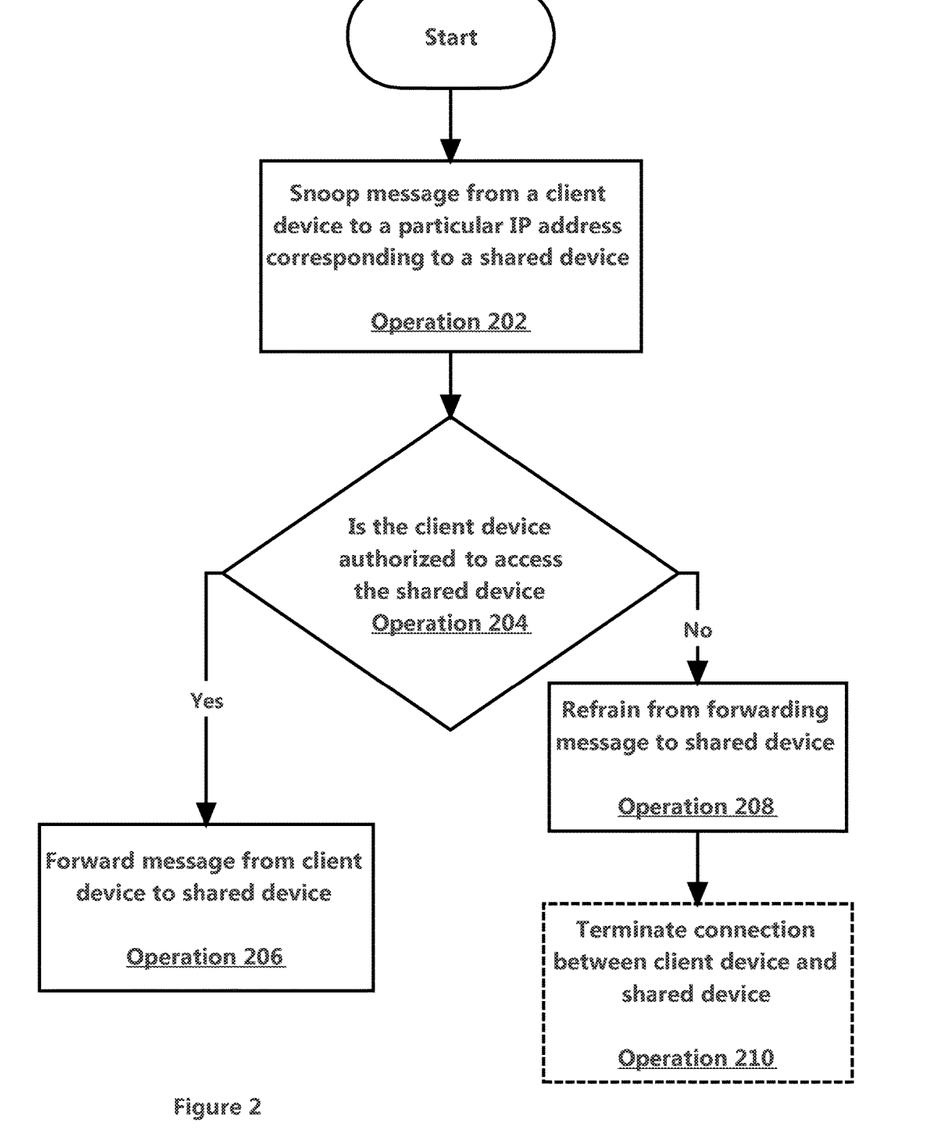
FIG. 2 shows a flow diagram including operations for a method related to controlling access to shared devices, in accordance with one or more embodiments.

FIG. 2 illustrates a set of operations for controlling access to a shared device in accordance with one or more embodiments.

Initially, a network device snoops a message from a client device addressed to a particular IP address corresponding to a shared device (Operation 202). Snooping may include simply identifying a source of the message and a destination of the message, or may involve a deeper inspection such as Deep Packet Inspection (DPI). In one example, snooping involves determining that the message is being sent from the client device to a particular shared device with the particular IP address. In another example, snooping may include determining that the message is a Transmission Control Protocol (TCP) connection request or other type of message.

In an embodiment, a snooping operation is performed if the message meets a particular criteria. For example, messages from any client device or messages from a particular client device are snooped. In another example, TCP messages are snooped.

The network device determines whether the client device has authorization to access the shared device (Operation 204). In an embodiment, the network device determines whether the client device has authorization to access the shared device by checking an access control list identifying devices that have access to the shared device. If an identifier for the client device (e.g., an IP address or a MAC address) is included in the access control list for the shared device, then the client device has access to the shared device. In an example, a mapping between IP addresses allowed to communicate with each other and/or a mapping between IP addresses not allowed to communicate with each other are maintained. Based on the mapping, a determination is made with a packet from a particular source IP address (indicated in the packet) is allowed to communicate with a particular destination IP address (indicated in the packet).

In an embodiment, the network device determines whether the client device has authorization to access the shared device by checking whether information corresponding to the shared device has been presented to the client device. In an example, a client device transmits a mDNS query to discover shared devices with a particular functionality of displaying a screen (e.g., a query for Apple TVs). In response, a network device identifies a subset of shared devices from all shared devices that (a) match the requested functionality and/or (b) match attributes of the client device. The network device may select the subset of shared devices that are within a physical proximity of the client device. The network device then presents the subset of shared devices to the client device (for example, in a mDNS message). Furthermore, the network device records the subset of shared devices that have been presented to the client device as shared devices that the client device is authorized to access. Presenting the subset of shared devices to the client device includes transmitting message(s) that identify an IP address of each of the subset of shared devices. Subsequently to presenting the subset of shared devices to the client devices, a message from the client device to a particular shared device is detected. A check is performed to determine whether the particular shared device is in the list of shared devices that the client device is authorized to access, e.g., determining whether the particular shared device was presented to the client device.

In an embodiment, the network device determines whether the client device has authorization to access the shared device by checking a list of authorized client devices maintained for that shared device. A network device maintains a list of authorized client devices per shared device. In an example, all user devices currently located in a same conference room as a particular shared device are determined to be devices authorized to access a shared device in that conference room. When a new device is detected in the conference room, the new device is added to the list of devices that are authorized to access the shared device in the conference room. When a device is detected to have left the conference room, that device is removed from the list of devices that are authorized to access the shared device. When a request for particular shared device is received from a client device, the list for the particular shared device (maintained or dynamically generated upon received the request) is checked to determine if the requesting client device is included in the list for the particular shared device.

If the client device is determined to be authorized to access the shared device in Operation 204, then the message from the client device is forwarded to the shared device (Operation 206). In an example, an access point or a controller on a communication path between the client device and the shared device performs Operation 204 to determine whether the client device is authorized to access the shared device. Responsive to determining that the client device is authorized to access the shared device, the access point or controller forwards the message from the client device toward the shared device.

If the client device is determined not be authorized to access the shared device in Operation 204, then the message from the client device is not forwarded to the shared device (Operation 208). In an example, an access point, a controller, or other network device on a communication path between the client device and the shared device performs Operation 204 to determine whether the client device is authorized to access the shared device. Responsive to determining that the client device is not authorized to access the shared device, the network device refrains from forwarding the message from the client device toward the shared device.

In an embodiment, the network device terminates the connection between the client device and the shared device addressed in the message by the client device (Operation 210). The network device terminates a Transmission Control Protocol (TCP) connection (or other connection) between the shared device and the client device. In an example, a controller explicitly instructs the client device to terminate the connection with the shared device and/or instructs the shared device to terminate the connection with the client device. In another example, a network device transmits a message to the client device that spoofs the shared device and terminates the connection with the client device on behalf of the shared device. In another example, a network device transmits a message to the shared device that spoofs the client device and terminates the connection with the shared device on behalf of the client device.

Although examples described above are related to refraining from forwarding packets from a client device to a shared device, embodiments may include refraining from forwarding packets from a shared device to a client device. For example, packets from a shared device may be snooped. If a determination is made that a client device is not authorized to access a particular shared device, a network device between the client device and the particular shared device may refrain from forwarding any packets from that particular shared device to that client device.

Figure 3:
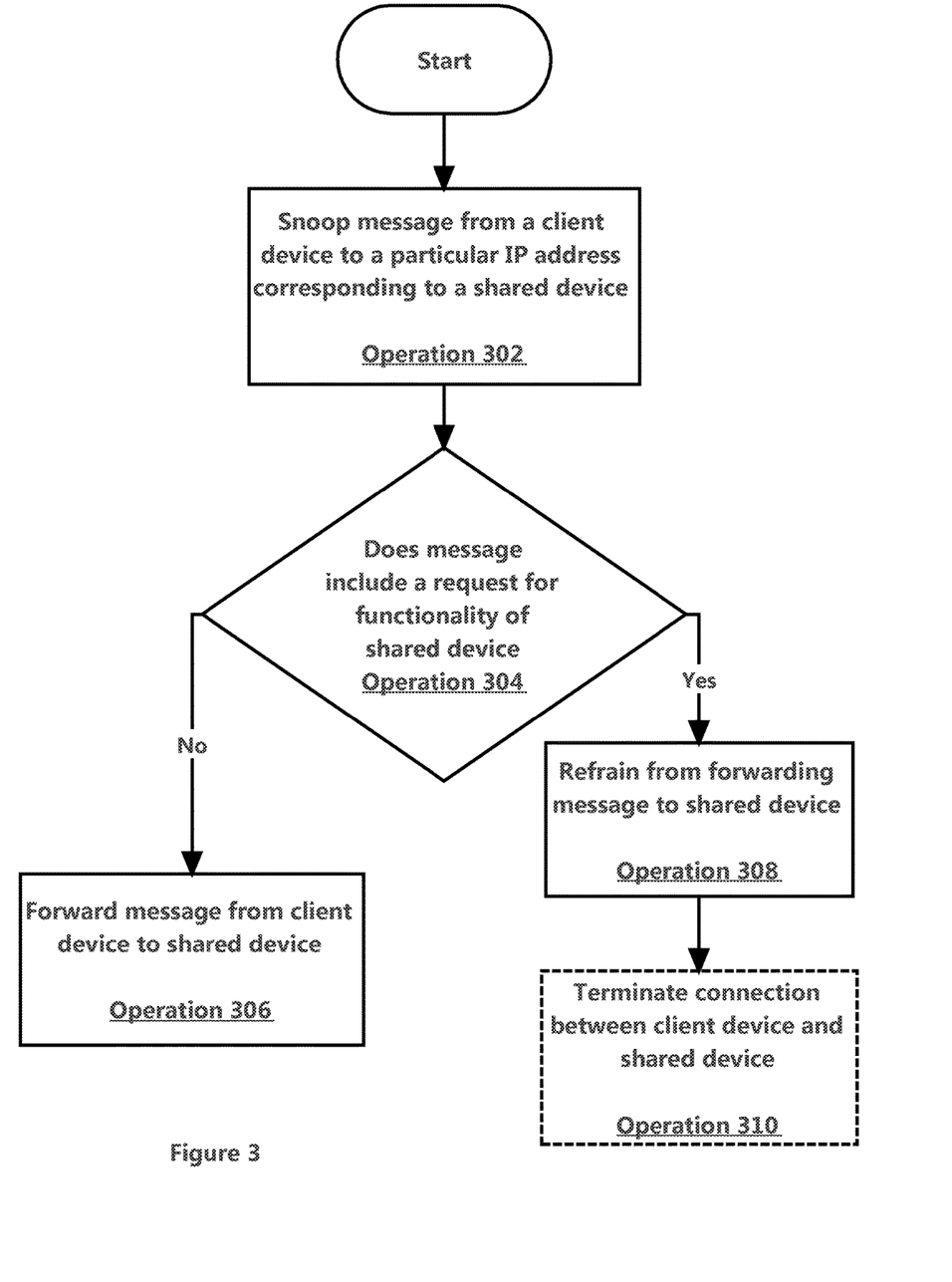
FIG. 3 shows a flow diagram including operations for a method related to controlling access to shared devices, in accordance with one or more embodiments.

D. Blocking a Request by a Client Device for Determining Functionality of a Shared Device FIG. 3 illustrates a set of operations for blocking a request by a client device for determining the functionality of a shared device. One or more embodiments include limiting a client device to a particular mechanism or protocol for the discovery of information about shared devices. In one example, a client device is limited to using a multicast Domain Name System (mDNS) protocol to discover information about shared devices. Messages that do not use the mDNS protocol to discover information about shared devices are not forwarded to destination devices indicated in the messages.

Initially, a network device snoops a message from a client device addressed to a particular IP address corresponding to a shared device (Operation 302). Snooping a message includes identifying contents of the message. In one example, a snooped message includes a Real Time Streaming Protocol (RTSP) query. Snooping the RTSP query includes identifying the contents of the RTSP query.

A determination is made whether the message includes a request for functionality of the shared device (Operation 304). In an embodiment, strings known to correspond to functionality requests are matched to contents of the message from the client device to the particular IP address corresponding to the shared device. In an example, a string "GET/info?txtAirPlay&txtRAOP RTSP/1.0" is known to correspond to a query for functionality of a device. The RTSP query transmitted by the client device is searched by the network device for the string "GET/info?txtAirPlay&txtRAOP RTSP/1.0". Upon identifying at least one occurrence of the string "GET/info?txtAirPlay&txtRAOP RTSP/1.0", the network device determines the message includes the request for functionality of the shared device. Although a particular string is used in the above example for determining that the message includes a request for device functionality, embodiments are applicable to making the determination based on a query for any string known to correspond to a request for functionality (e.g., strings that may be defined in future versions of the protocol and/or strings used in other protocols).

If a determination is made, in Operation 304, that the message from the client device does not include a request for functionality, the request is forwarded on toward a destination address (Operation 306). In an example, an access point or a controller on a communication path between the client device and the shared device performs Operation 304 to determine whether the message includes a request for device functionality. Responsive to determining that the message does not include a request for device functionality, the access point or controller forwards the message from the client device toward the shared device.

If a determination is made, in Operation 304, that the message from the client device does include a request for functionality, the message is not forwarded to the shared device (Operation 308). In an example, an access point, a controller, or other network device on a communication path between the client device and the shared device performs Operation 304 to determine whether the client device is authorized to access the shared device. Responsive to determining that the client device is not authorized to access the shared device, the network device refrains from forwarding the message from the client device toward the shared device.

In an embodiment, the network device terminates the connection between the client device and the shared device addressed in the message by the client device (Operation 310). The network device terminates a Transmission Control Protocol (TCP) connection (or other connection) between the shared device and the client device. In an example, a controller explicitly instructs the client device to terminate the connection with the shared device and/or instructs the shared device to terminate the connection with the client device. In another example, a network device transmits a message to the client device that spoofs the shared device and terminates the connection with the client device on behalf of the shared device. In another example, a network device transmits a message to the shared device that spoofs the client device and terminates the connection with the shared device on behalf of the client device.

While embodiments have been described with respect to a limited number of embodiments, those skilled in the art, having benefit of this disclosure, will appreciate that other embodiments can be devised which do not depart from the scope of the claims as disclosed herein. Accordingly, the scope of the claims should be limited only by the attached claims.

The invention claimed is:

1. A non-transitory computer readable medium comprising instructions which, when executed by one or more hardware processors, causes performance of operations comprising:
    snooping, by a network device, a message sent from a client device and addressed to a particular IP address corresponding to a shared device while the message is being transmitted to the shared device, wherein the message is not addressed to the network device;
    determining, by the network device, whether the client device is allowed to access the shared device based on the particular IP address;
    responsive to determining that the client device is not allowed to access the shared device, refraining from forwarding the message to the particular IP address;
    responsive to determining that the client device is allowed to access the shared device, forwarding the message to the particular IP address.

2. The medium of claim 1, wherein refraining from forwarding the message to the particular IP address is further responsive to determining that the message comprises a request by the client device to open a connection with the shared device.

3. The medium of claim 1, wherein the message comprises a Transmission Control Protocol (TCP) connection request.

4. The medium of claim 1, wherein determining that the client device is not allowed to access the shared device comprises determining that the information corresponding to the shared device was not previously transmitted by the network device to the client device.

5. The medium of claim 1, wherein determining that the client device is not allowed to access the shared device comprises determining that the particular IP address corresponding to the shared device was not previously transmitted by the network device to the client device.

6. The medium of claim 1, wherein determining that the client device is allowed to access the shared device comprises determining that the information corresponding to the shared device was previously transmitted by the network device to the client device.

7. The medium of claim 1, wherein determining whether the client device is allowed to access the shared device comprises checking whether the client device is listed in an access control list identifying devices that have access to the shared device.

8. The medium of claim 1, wherein determining whether the client device is allowed to access the shared device comprises checking whether the shared device is listed in an access control list identifying devices that the client device is allowed to access.

9. A non-transitory computer readable medium comprising instructions which, when executed by one or more hardware processors, causes the one or more hardware processors to:
    snoop, by a network device, a message sent from a client device and addressed to a particular IP address corresponding to a shared device while the message is being transmitted to the shared device, wherein the message is not addressed to the network device;
    determine that the message comprises a request for functionality of the shared device based on the particular IP address;
    responsive at least to a determination that the message comprises a request for functionality of the shared device:
        refrain from forwarding the message to the particular IP address.

10. The medium of claim 9, wherein the instructions are further to cause the one or more hardware processors to refrain from forwarding the message to the particular IP address responsive to a determination that the client device is not allowed to access the shared device.

11. The medium of claim 10, wherein the instructions are further to cause the one or more hardware processors to determine that the client device is not allowed to access the shared device in response to a determination that the information corresponding to the shared device was not previously transmitted by the network device to the client device.

12. The medium of claim 10, wherein the instructions are further to cause the one or more hardware processors to determine that the client device is not allowed to access the shared device in response to a determination that the client device is not listed in an access control list identifying devices that have access to the shared device.

13. The medium of claim 9, wherein the instructions are further to cause the one or more hardware processors to:
  responsive at least to a determination that the message comprises a request for functionality of the shared device:
    instruct the client device to terminate a connection with the shared device.

14. The medium of claim 9, wherein the instructions are further to cause the one or more hardware processors to:
  responsive at least to a determination that the message comprises a request for functionality of the shared device:
    transmit a message to the client device that spoofs the shared device and terminates a connection between the shared device and the client device.

15. The medium of claim 9, wherein the instructions are further to cause the one or more hardware processors to:
  responsive at least to a determination that the message comprises a request for functionality of the shared device:
    determine whether the client device is allowed to access the shared device;
  responsive to a determination that the client device is allowed to access the shared device:
    transmit information to the client device that identifies the functionality of the shared device.

16. The medium of claim 9, wherein the instructions are further to cause the one or more hardware processors to determine that the message comprises a request for functionality of the shared device in response to a determination that the message comprises one or more strings corresponding to a request for functionality of the shared device.

17. A system comprising:
  a network device including a hardware processor;
  a memory on which is stored instructions that are to cause the hardware processor to:
    snoop a message sent from a client device and addressed to a particular IP address corresponding to a shared device while the message is being transmitted to the shared device, wherein the message is not addressed to the network device;
    determine whether the client device is allowed to access the shared device based on the particular IP address;
    responsive to a determination that the client device is not allowed to access the shared device, refrain from forwarding the message to the particular IP address; and
    responsive to a determination that the client device is allowed to access the shared device, forward the message to the particular IP address.

18. The system of claim 17, wherein the instructions are further to cause the hardware processor to determine whether the message comprises a request by the client device to open a connection with the shared device, and to refrain from forwarding the message to the particular IP address in response to a determination that the message comprises a request by the client device to open a connection with the shared device.

19. The system of claim 17, wherein the message comprises a Transmission Control Protocol (TCP) connection request.

20. The system of claim 17, wherein to determine that the client device is not allowed to access the shared device, the instructions are further to cause the hardware processor to determine that the information corresponding to the shared device was not previously transmitted by the network device to the client device.

21. The system of claim 17, wherein to determine that the client device is not allowed to access the shared device, the instructions are further to cause the hardware processor to determine that the particular IP address corresponding to the shared device was not previously transmitted by the network device to the client device.

22. The system of claim 17, wherein to determine that the client device is allowed to access the shared device, the instructions are further to cause the hardware processor to determine that the information corresponding to the shared device was previously transmitted by the network device to the client device.

23. The system of claim 17, wherein to determine whether the client device is allowed to access the shared device, the instructions are further to cause the hardware processor to check whether the client device is listed in an access control list identifying devices that have access to the shared device.

* * * * *